United States Patent [19]
Russ

[11] Patent Number: 5,444,760
[45] Date of Patent: Aug. 22, 1995

[54] ROUTING OF SPECIAL EMERGENCY CALLS

[75] Inventor: Lila N. Russ, Aurora, Ill.

[73] Assignee: AT&T Corp., Murray Hill, N.J.

[21] Appl. No.: 178,724

[22] Filed: Dec. 28, 1993

[51] Int. Cl.⁶ .......................................... H04M 11/04
[52] U.S. Cl. ........................................ 379/45; 379/37
[58] Field of Search .................. 379/37, 40, 41, 45, 379/48, 49, 51, 88, 89, 67, 212, 213, 214, 93, 97

[56] References Cited

U.S. PATENT DOCUMENTS

| | | | |
|---|---|---|---|
| 3,881,060 | 4/1975 | Connell et al. | 379/45 |
| 4,310,726 | 1/1982 | Asmuth | 379/45 |
| 5,195,126 | 3/1993 | Carrier et al. | 379/45 |
| 5,239,577 | 8/1993 | Bates et al. | 379/213 |
| 5,311,569 | 5/1994 | Brozovich et al. | 379/45 |

Primary Examiner—Curtis Kuntz
Assistant Examiner—Jason Chan

[57] ABSTRACT

A call is routed from a calling station on the one hand, by directing the call, in response to dialing by the calling station of an assigned emergency number, to an emergency answering service. On the other hand, in response to a command such as dialing by the calling station of a predetermined exigency code, the call is routed by accessing from a data base one of a number of a given exigency stations associated with the command, the calling number, the calling address, and/or the exigency station address; and directing the call from the calling station to the accessed exigency station.

12 Claims, 1 Drawing Sheet

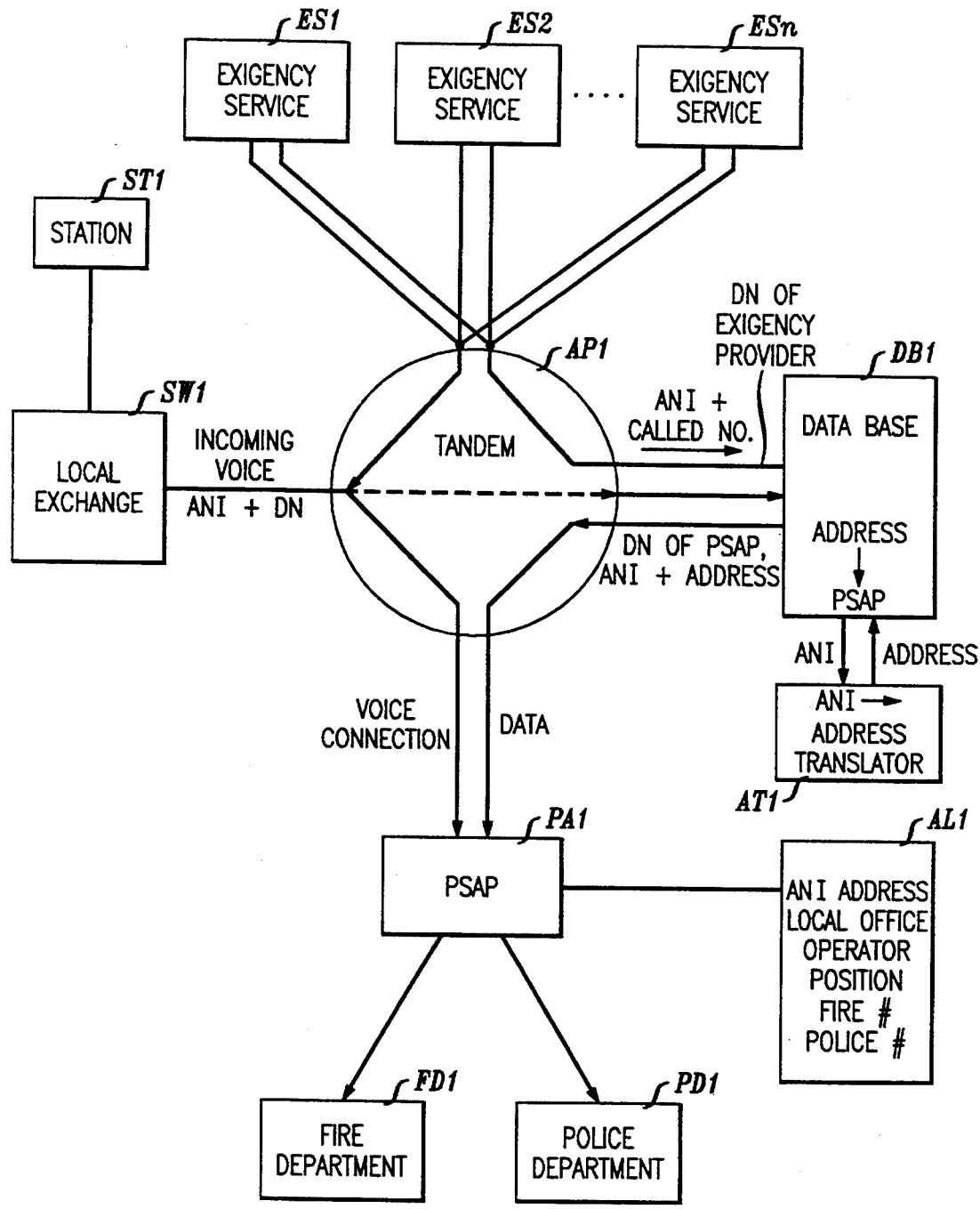

ROUTING OF SPECIAL EMERGENCY CALLS

FIELD OF THE INVENTION

This invention relates to telephone systems, and particularly to telephone systems offering emergency 911 services.

BACKGROUND OF THE INVENTION

Current telephone systems afford customers the opportunity to use 911 telephone services for emergencies. A central office switch routes dialed 911 calls, together with the calling parties automatic number identification (ANI) to a police department, fire department, or other special emergency service. The providers of such emergency services, namely the police, fire department, etc. are often flooded with calls for other services, such as from power companies in the event of power outages, gas companies, hospitals, governmental agencies, and even television cable companies. The subscribers utilize the 911 numbers for these purposes because they may not have sufficient time to look for these services in telephone directories or to dial directory assistance.

An object of the invention is to improve emergency services.

Another object of the invention is to overcome these difficulties.

SUMMARY OF THE INVENTION

According to a feature of the invention, such objects are attained, in whole or in part, by directing the call to an emergency answering service in response to dialing by the calling station of an assigned emergency number; in response to dialing by the calling station of a predetermined exigency code, accessing from a data base a number of a given exigency station associated with one or more of a number of factors, such as the code, the number of the caller, and the address of the caller; and directing the call from the calling station to the given exigency station.

According to another feature of the invention, the data base maintains data concerning the caller at the number, such as whether the caller is confined to bed, uses a respirator, etc.

According to another feature of the invention, the indication is by voice and automatically routed response to the voice.

According to another feature of the invention, the indication is by dialing.

According to yet another feature of the invention, the indication is by keyboard.

These and other features of the invention are pointed out in the claims. Other objects and advantages of the invention will become evident from the following detailed description when read in light of the accompanying drawings.

BRIEF DESCRIPTION OF THE DRAWING

FIG. 1 is a block diagram of a telephone system embodying features of the invention.

DETAILED DESCRIPTION OF PREFERRED EMBODIMENTS

In the telephone system of FIG. 1, a telephone station ST1 connects to a local switch SW1 which in turn connects to an enhanced 911 service tandem TA1. Connected to the tandem TA1 is an automatically or manually-operated public service answering point (PSAP) AP1 in which personnel are available to connect incoming calls to various emergency services such as police PD1, fire FD1, etc. An automatic location information retrieval network for data base information (ALI/DMS) AL1 provides information to the personnel working in the PSAP. The PSAP AP1 may ask the caller respond to a voice menu and dial certain information, or by voice contact.

The tandem TA1 also connects to a data base DB1 that lists addresses of such emergency service providers as well as exigency service providers. The term exigency service is used herein to distinguish such services from the emergency services performed by police, fire or one of the departments maintained by municipalities specifically for emergency services. Exigency service refers to service providers such as power companies, gas companies, hospitals, physicians, cable services, and the services of political units of the United States, the state, or the municipality. These are also termed non-emergency services.

An address translator AT1 cooperates with the data base DB1 so that together they store and coordinate the ANIs of the stations such as the station ST1, the addresses of the exigency service providers, and personal emergency information concerning the ANI subscribers. Such personal information could include whether the subscriber uses a respirator, is a paraplegic, is a diabetic, is deaf, and is blind, and may also store an emergency notification number. The data base DB1 coordinates the addresses of the subscribers with the locations of the emergency services, and the personal emergency information with the subscriber number. When a subscriber moves but retains the same number, the association of the number with the personal emergency information continues, but the address association with the exigency service may change.

In operation, an incoming voice call from station ST1 arrives at the tandem TA1. If it is an ordinary call, the call is switched to the destination station. If the call is a 911 call, tandem TA1 switches it directly to the PSAP PA1 together with the calling ANI and address, on the basis of data from the data base DB1. The personnel at the PSAP PA1 utilizing the ALI/DMS AL1 connect the call to the appropriate fire department, police department, or other emergency service.

The tandem TA1 accesses the data base DB1 and connects the calling station ST1 to one of the exigency providers ES1, ES2 . . . ESn selected by the data base DB1 on the basis of the initial code. Simultaneously it transmits the calling ANI and DN to the exigency service provider station ST2.

According to an embodiment of the invention, instead of, or in addition to, having separate codes for the exigency services, the tandem TA1 causes the local switch SW1 to respond to a universal code for all exigency services. It then furnishes the caller with a voice menu, to which the caller responds by a dialing one of a number of exigency service codes, by keyboard, or by voice command.

The invention establishes a special data base for the system to allow touchtone and ISDN (Integrated Services Digital Network) CPE users to search for non-emergency numbers for public service, utility, and government phone numbers and connect automatically to the number as the 911 does to the PSAP. The invention provides a more effective way of identifying the proper service number based on the callers 911 data rather than approximations by location for information searches. It enhances the attractiveness of the emergency service adjunct (ESA) for deployment in switching systems and increases the value added for the ESA. The invention establishes in the ESA emergency service number data base all appropriate non-emergency service numbers where certain key words could point to the correct non-emergency service number for public utilities, emergency service organizations, and governmental agencies. For example, the FBI would provide the correct FBI office number, fire would provide the non-emergency number, water would provide the correct public utility number etc. According to an embodiment of the invention, all the services are place in an E9-1-1 data base. According to another embodiment of the invention, the subscriber ST1 can report non-emergencies in another location by typing the city name and the particular utility desired. This can be done by speaking or typing. For example, speaking "Aurora water" would provide the Aurora Water Department all hours number.

The invention avoids the problems of systems which would requiring searching of a telephone directory or utilizing directory assistance. With an Integrated Services Digital Network (ISDN) set the correct number appears and is auto-called or automatically connected. With touchtone, the correct service name or location is dialed, and the number automatically signalled by the switch.

The invention improves the efficiency of emergency service answering points and provides for the correct non-emergency or exigency numbers associated with the address of the ANI/Directory numbers. It provides for public dialing that furnishes information without a reserved emergency number being answered, and affords exigency numbers and proper organization information. It also offers pertinent subscriber information to the emergency answering organization.

While embodiments of the invention have been described in detail, it will be evident to those skilled in the art that the invention may be embodied otherwise without departing from its spirit and scope.

What is claimed is:

1. A method of routing a call from a calling station, comprising:
   directing the call, in response to dialing by the calling station of an assigned emergency number, to an emergency answering service;
   diverting predetermined calls from the emergency answering service, said diverting step including:
   in response to dialing by the calling station of a predetermined exigency command, accessing from a data base a number and address of a given exigency station associated with the command; and
   directing the call from the calling station to the given exigency station.

2. A method as in claim 1, wherein the step of accessing includes acquiring from the data base a number and address of a given exigency station associated with the command and with the address of the caller.

3. A method as in claim 1, wherein the step of accessing includes acquiring from the data base a number and address of a given exigency station associated with the command and with health condition of the caller.

4. A method as in claim 1, wherein the step of accessing includes acquiring from the data base a number and address of a given exigency station associated with the command, with the address of the caller, and with the health condition of the caller.

5. A method as in claim 1, wherein the predetermined command is a mnemonic associated with the given exigency station.

6. A system for routing telephone calls from a calling station having a number, comprising:
   emergency answering service means responsive to dialing by the calling station of an assigned emergency number, for directing a call and the number of the call to said emergency answering service mean;
   a plurality of exigency stations;
   means for diverting predetermined calls from said emergency answering service mean, including:
   a data base listing exigency ANIs and a code associated with each exigency ANI;
   means responsive to dialing by the calling station of a predetermined exigency command for accessing from said data base an ANI of a given exigency station associated with the command; and
   means for directing the call from the calling station ANI, of the calling station to the exigency station.

7. A system as in claim 6, wherein the means for accessing includes means for acquiring from the data base a number and address of a given exigency station associated with the command and with the address of the caller.

8. A system as in claim 6, wherein the means for accessing includes means for acquiring from the data base a number and address of a given exigency station associated with the command and with health condition of the caller.

9. A system as in claim 6, wherein the means for accessing includes means for acquiring from the data base a number and address of a given exigency station associated with the command, with the address of the caller, and with the health condition of the caller.

10. A system as in claim 6, wherein the predetermined command is a mnemonic associated with one of the exigency stations.

11. A system as in claim 6, wherein the predetermined command is a dialed code associated with one of the exigency stations.

12. A method as in claim 1, wherein the predetermined command is a code dialed by the caller.

* * * * *